(12) United States Patent
DeLellis et al.

(10) Patent No.: US 7,699,402 B2
(45) Date of Patent: Apr. 20, 2010

(54) FOUR POINT SEAT RESTRAINT SYSTEM

(75) Inventors: Louis D DeLellis, South Lyon, MI (US);
John E Schambre, Canton, MI (US);
Michael O Forker, Novi, MI (US)

(73) Assignee: Chrysler Group LLC, Ausburn Hills, MI (US)

( * ) Notice: Subject to any disclaimer, the term of this patent is extended or adjusted under 35 U.S.C. 154(b) by 127 days.

(21) Appl. No.: 11/615,058

(22) Filed: Dec. 22, 2006

(65) Prior Publication Data

US 2007/0102991 A1    May 10, 2007

Related U.S. Application Data

(63) Continuation of application No. 11/156,407, filed on Jun. 20, 2005.

(51) Int. Cl.
*B60R 22/00* (2006.01)
(52) U.S. Cl. .................. 297/485; 297/484; 297/467
(58) Field of Classification Search ................. 297/484, 297/464, 483, 485
See application file for complete search history.

(56) References Cited

U.S. PATENT DOCUMENTS

| | | | |
|---|---|---|---|
| 2,856,991 A | 10/1958 | Princlotta | |
| 3,321,247 A | 5/1967 | Dillender | |
| 3,325,213 A * | 6/1967 | Levy | 297/467 |
| 3,954,280 A * | 5/1976 | Roberts et al. | 280/801.2 |
| 4,231,616 A * | 11/1980 | Painter | 297/481 |
| 4,674,800 A * | 6/1987 | Ensign | 297/465 |
| 4,854,608 A * | 8/1989 | Barral | 280/805 |
| 4,915,413 A * | 4/1990 | Meyer | 280/801.1 |
| 5,074,588 A * | 12/1991 | Huspen | 280/801.1 |
| 5,076,598 A | 12/1991 | Nauman | |
| 5,580,126 A * | 12/1996 | Sedlack | 297/256.15 |
| 5,733,014 A | 3/1998 | Murray | |
| 6,089,662 A * | 7/2000 | Lambert et al. | 297/238 |
| 6,260,925 B1 * | 7/2001 | Miller | 297/467 |
| 6,471,298 B2 * | 10/2002 | Carine et al. | 297/483 |
| 6,601,923 B2 * | 8/2003 | Pond et al. | 297/484 |
| 6,616,242 B1 * | 9/2003 | Stoll | 297/485 |
| 6,698,841 B1 * | 3/2004 | Glover et al. | 297/484 |
| 6,955,403 B1 * | 10/2005 | Weaver | 297/485 |
| 7,347,494 B2 * | 3/2008 | Boyle et al. | 297/253 |
| 2004/0169411 A1 * | 9/2004 | Murray | 297/486 |

* cited by examiner

*Primary Examiner*—David Dunn
*Assistant Examiner*—Erika Garrett
(74) *Attorney, Agent, or Firm*—Ralph E. Smith

(57) ABSTRACT

A restraint system is disclosed for securing a passenger to a seat in a motor vehicle. The restraint system is composed of a restraint belt removably attached to a vehicle seat having a plurality of vertical straps and an attachment mechanism for connecting said straps across the passenger's chest. Each of the vertical straps has a first end removably attached to a lap belt and a second end removably attached to a latch located behind the vehicle seat.

17 Claims, 1 Drawing Sheet

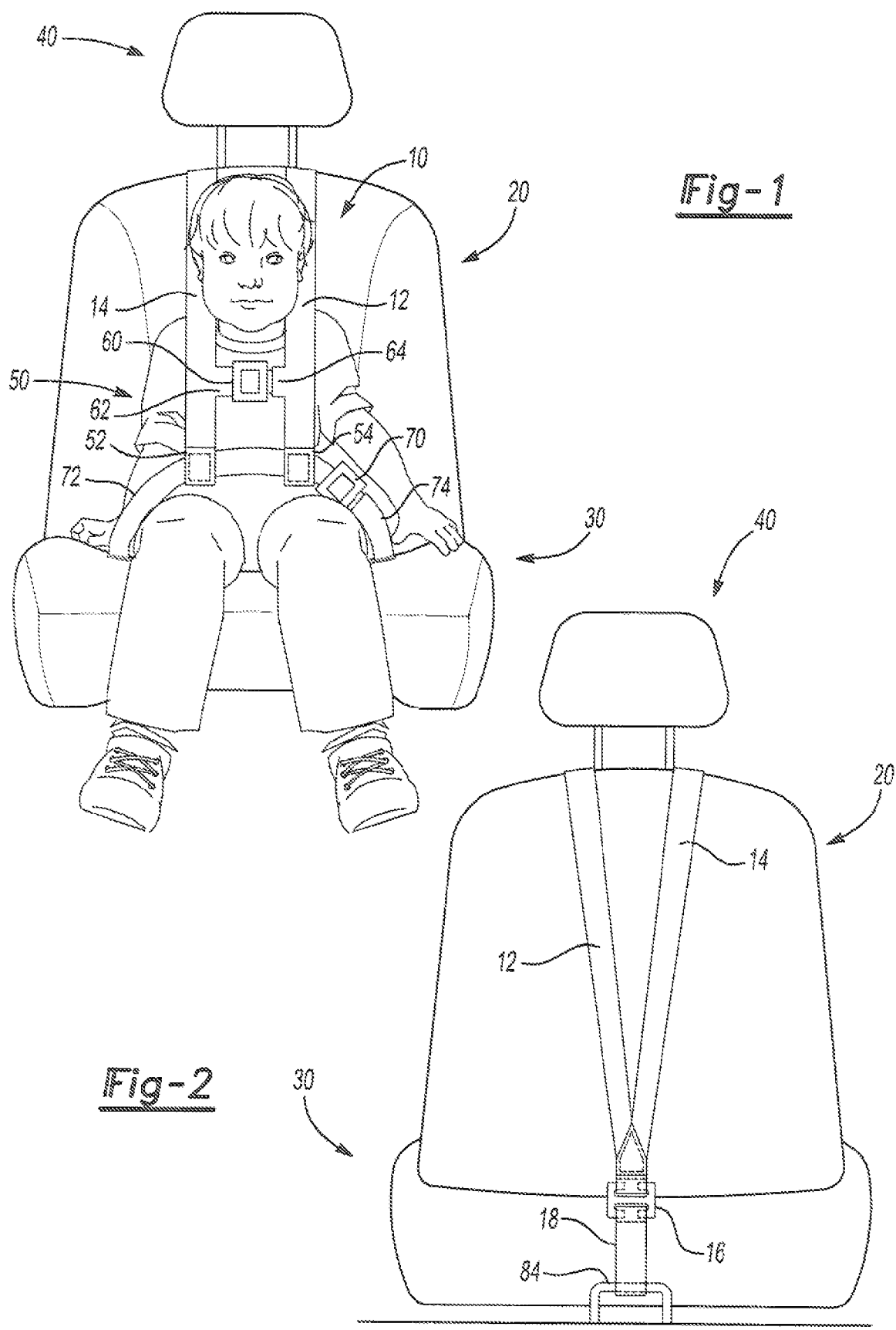

FOUR POINT SEAT RESTRAINT SYSTEM

CROSS-REFERENCE TO RELATED APPLICATIONS

This application is a Continuation Application of U.S. Ser. No. 11/156,407 filed on Jul. 20, 2005 the disclosure of which is incorporated herein by reference.

FIELD OF THE INVENTION

The present invention relates to child safety restraint devices, and more particularly, to an adjustable restraint system of securing a child weighing more than sixty pounds to a vehicle seat.

BACKGROUND OF THE INVENTION

Federal vehicle seat minimum performance standards have been established to ensure a reasonable degree of safety for a seat occupant. In the case where vehicle seats are intended for children, these performance standards require providing a child with a seat restraint compatible with the child's size. Among other requirements, when the child is secured in the seat, the restraints should not pass over the face, neck or throat of the child. As a result, child restraint systems are typically provided in many sizes and configurations.

A wide variety of potential child restraint systems are well known in the art and include both conventional forward (or rearward) facing car seats and boaster seats which utilize the vehicle supplied shoulder and lap belt for restraining the child in the seat. Each of these potential child restraint systems possess known drawbacks resulting from the rapid growth and development of children. Conventional car seats tend to be "grown out of" in relatively short periods of time, requiring adjustment or replacement at various stages of the physical development of the child. Conventional car seats also are typically only intended to safely and comfortably secure a child weighing up to sixty pounds. Boaster seats which utilize the vehicle supplied shoulder and lap belt for restraining the child in the seat can be difficult to position and adjust to provide a larger child with maximum benefit from the restraint system. Both conventional car seats and child booster seats are also balky and create storage and space availability issues when not in use within a vehicle.

It is therefore desirable to provide a child restraint system that is easily adjustable, compact and capable of accommodating and providing a child weighing over sixty pounds with the maximum benefit from the restraint system.

SUMMARY OF THE INVENTION

Accordingly, one aspect of the present invention provides a restraint system for securing a child in a motor vehicle capable of accommodating and providing a child weighing over sixty pounds with the maximum benefit of a seat restraint system.

Another aspect of the present invention is to provide a restraint system having a high degree of adjustability for accommodating a range of seat occupants using a minimal number of independently adjustable parts.

In accordance with the foregoing aspects of the invention, a seat restraint system is shown that includes a restraint belt removably attached to a vehicle seat having a plurality of vertical straps and an attachment mechanism for connecting said straps across the passenger's chest. Each of the vertical straps has a first end removably attached to a lap belt and a second end removably attached to a latch located behind the vehicle seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 s a front view of a seat restraint system according to an exemplary embodiment of the present invention; and FIG. 2 is a rear view of a seat restraint system according to an exemplary embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Referring now to the drawings, an exemplary embodiment of the present invention described hereinafter according to FIGS. 1 and 2. As shown in FIG. 1, a seat restraint system 10 according to the present invention is shown that is used for securing a passenger 50 to a seat 30. The vehicle seat 30 has a seat back 20 that extends vertically upward from the horizontally positioned seat as is well known in the art. A headrest 40 may also be attached to the top of the seat back 20.

FIG. 1 shows a passenger 50 in a sitting position on the seat 30. The passenger is secured to the seat 30 by the restraint system 10. The restraint system 10 consists of two shoulder straps 12 and 14 that extend vertically upward over the passenger's shoulders and are looped over the top of the seat back 20 and headrest 40. The shoulder straps 12 and 14 are first secured to the vehicle by forward attachment mechanisms 52 and 54. In an exemplary embodiment of the present invention, the forward attachment mechanisms are loops 52 and 54 integrally formed with the shoulder straps 12 and 14. A lap belt, which is attached to the front of the seat back 20, is then placed within the loops 52 and 54 to interconnect the shoulder straps 12 and 14 at a front location overlying the lap of the passenger 50. The lap belt has two component parts 72 and 74 each having a component of a quick-release, conventional seat belt buckle fastener 70, with a male portion, mating female portion, release mechanism and length adjustable slide mechanism as is well-known in the art.

The restraint system 10 has a chest belt attached to the shoulder swaps 12 and 14. The chest belt interconnects the shoulder straps 12 and 14 at a front location overlying the chest of the passenger 50 with the chest belt having two component parts 62 and 64, one attached to each of the shoulder straps by any suitable method, such as sewing. The two component parts each have a component of a quick-release, conventional seat belt buckle fastener 60, with a male portion, mating female portion, release mechanism and length adjustable slide mechanism as is well-known in the art. It is understood that while the exemplary embodiment of the present invention details a horizontal chest belt, the present invention also encompasses the use of a simple tongue and buckle arrangement located at chest level for connecting the shoulder straps 12 and 14.

FIG. 2 shows a rear view of the restraint system 10 attached to the vehicle seat 30. The shoulder straps 12 and 14, which are looped over the seat back 20 on either side of the head rest 40, are then secured to the vehicle behind the seat back 20 by means of a rear latch mechanism 84 located behind the seat. In an exemplary embodiment of the present invention, shoulder straps 12 and 14 are joined together prior to attaching to the rear latch mechanism 84. After the shoulder straps 12 and 14 are joined to each other, the straps connect to a length adjustable fastener 16. As shown in FIG. 2, the fastener 16 is a simple buckle connected to a connector strap 18 having a loop fed through the fastener 16 to allow the length of the connector strap 18 to be adjusted to a variety of lengths. The connector strap 18 is then connected to the rear latch mechanism 84. The rear latch mechanism 84 consists of tether anchor hooks which may be located on the rear window ledge of the vehicle, the back of the vehicle seat, or on the floor of the vehicle as is well known in the art. A rear latch mechanism 84 centered relative to the vehicle seat is desirable as a direct restraint minimizing the ability of the restraint system to move out of position and enabling the passenger 50 to be positioned in an unfavorable load path relative to the restraint system 10.

After attachment of the restraint system 10 to the vehicle as described above, the passenger 50 may then be secured in the vehicle through use of the chest belt 62, 64 and buckle 60 and lap belt 72, 74 and buckle 70. The passenger is then secured to the vehicle seat 30 in a safe and comfortable seating position. The advantage of the present invention over prior restraint systems is that it is easily adjustable to accommodate a wide variety of sizes of children weighing sixty pounds who are too large for conventional car seats but too small to use vehicle provided safety restraints. Another advantage of the present invention is that the restraint system of the present invention is easily removable and compact for storage purposes when not in use.

It is noted that in an exemplary form of the invention, all of the strap components are made of conventional nylon webbing, but those skilled in the art will recognize that other materials may be used to construct the strap components of the present invention. It is further noted that while the exemplary embodiment described herein describes the use of a length adjustable fastener 16 and connector strap 18, those skilled in the art will recognize that the shoulder straps 12 and 14 may be connected directly to the rear latch mechanism 84. Those skilled in the art will further recognize that length adjustment mechanisms may be added to each shoulder strap 12 and 14 as an alternate means of permitting the adjustment of the restraint system 10 to fit a variety of passenger sizes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A restraint system for securing a passenger in a motor vehicle seat, the seat having a seat back having a head rest and a lap belt arranged to be deployed across the lap of an occupant sitting in the seat, the restraint system comprising:

a restraint belt attached to a vehicle seat, the restraint belt having a plurality of straps extending vertically with respect to said passenger with one of said plurality of vertically extending strays having a portion disposed alongside and adjacent one side of said head rest and another one of said plurality of vertically extending straps having a portion disposed alongside and adjacent the other side of said head rest and an attachment mechanism for connecting said vertically extending straps across said passenger's chest;

each of said vertically extending straps having a first end with a forward attachment member selectively attached to said lap belt when the lap belt is in a deployed position;

each of said vertically extending straps having a second end operatively connected to a connector strap by a length adjustable fastener with the connector strap having one end attached to the length adjustable fastener and the connector strap having its other end attached to a rear latch that is permanently attached to said vehicle at a position behind said vehicle seat and below a top of said seat back.

2. The restraint system of claim 1, wherein said forward attachment members comprise loops ranged to allow the lap belt to pass through the loops as it is deployed across the front of the lap of said passenger.

3. The restraint system of claim 2, wherein each of said loops is integrally formed with said straps.

4. The restraint system of claim 1, wherein a portion of each one of said plurality of vertically extending straps overlie a portion of a front side of said passenger restraining said passenger in said vehicle seat.

5. The restraint system of claim 4, wherein said rear latch is a tether anchor hook located on one of a rear window ledge of the vehicle, a back of said vehicle seat, and a floor of the vehicle.

6. The restraint system of claim 1, wherein said first attachment mechanism further comprises a conventional seat belt buckle with a male portion, a mating female portion, and release mechanism, and a length adjustable slide mechanism.

7. A four-point restraint system for securing a passenger in a motor vehicle, the restraint system comprising:

a lap belt arranged to be deployed over a seat bottom of a seat mounted in the vehicle, the seat including a seat back having a head rest;

a pair of vertical straps selectively attached to the seat, the vertical straps arranged to extend vertically from each respective shoulder of the passenger overlying a portion of each said respective shoulder, said pair of vertical straps extending forward and rearward relative to said seat back with one of said pair of vertical straps disposed between a top of said seat back and a portion of the head rest adjacent one side of the head rest and the other one of said pair of vertical straps disposed between a top of said seat back and a portion of the head rest adjacent the other side of the head rest and adapted to secure said passenger to said vehicle seat;

a pair of horizontal straps with one of said horizontal straps attached to one of said vertical straps, the other one of said horizontal straps attached to the other one of said vertical straps, and extending across a front of said passenger's torso when said pair of horizontal straps are detachably fastened to one another;

each one of said pair of vertical straps having a first end with a forward attachment member that is attached to said lap belt and each one of said pair of vertical straps having a second end connected by a buckle to a connector strap enabling restraint system position adjustment relative to the size of said passenger with said connector strap having one end attached to the buckle and said connector strap having its other end attached to a rear latch that is permanently attached to the motor vehicle at a position behind the seat.

8. The restraint system, of claim 7, wherein said forward attachment members comprise loops arranged to allow the lap belt in pass through the loops as it is deployed across the front of the lap of said passenger.

9. The restraint system of claim 7, wherein each of said loops is integrally formed with said straps.

10. The restraint system of claim 7, wherein said rear latch comprises a tether anchor hook.

11. The restraint system of claim 7, wherein said pair of horizontal straps are detachably fastened to one another using a conventional seat belt buckle having a male portion, a mating female portion, and release mechanism, and a length adjustable slide mechanism.

12. A restraint system for securing a passenger in a motor vehicle seat, the seat having a seat back with a head rest and a lap belt arranged to be deployed across the lap of an occupant sitting in the seat, the restraint system comprising:
- a restraint belt removably attached to a vehicle seat, the restraint belt having a plurality of straps extending vertically with respect to said passenger that each include a portion overlying and extending across said passenger's shoulders and an attachment mechanism for connecting said straps across said passenger's chest;
- each of said straps having a first end with a forward attachment member removably attached to said lap belt when the lap belt is in a deployed position; and
- each of said straps having a second end disposed rearwardly of said passenger with a rear attachment member removably attached to rear of said vehicle seat;
- wherein a portion of one of said plurality of vertically extending straps between said first end and said second end overlies a top of said seat back on one side of said head rest and a portion of another one of said plurality of vertically extending straps between said first end and said second end overlies said top of said seat back on the other side of said head rest; and
- wherein said rear attachment members of said plurality of straps are the only portions of the restraint system that are removably attached to a rear latch that is permanently attached to said vehicle at a position behind said vehicle seat.

13. The restraint system of claim 12, wherein said forward attachment members comprise loops arranged to allow the lap belt to pass through the loops as it is deployed across the front of the lap of said passenger.

14. The restraint system of claim 12, wherein each of said loops is integrally formed with said straps.

15. The restraint system of claim 12, wherein said rear latch is a tether anchor hook.

16. The restraint system of claim 12, wherein said rear attachment members further comprise one of said rear attachment members arranged to attach to the other of said rear attachment members and attached to a buckle adjustably connected to an extension strap for adjusting the position of the restraint system relative to the size of the passenger and wherein the passenger comprises a child weighing more than sixty pounds.

17. The restraint system of claim 12, wherein said first attachment mechanism further comprises a conventional seat belt buckle with a male portion, a mating female portion, and release mechanism, and a length adjustable slide mechanism.

* * * * *